May 10, 1932.                J. M. COFFEY                1,857,586
COMPOSITE INSULATING MATERIAL

Filed Oct. 12, 1929

INVENTOR
Joseph M. Coffey,
BY
Bartlett, Eyre, Scott & Keel
ATTORNEYS

Patented May 10, 1932

1,857,586

UNITED STATES PATENT OFFICE

JOSEPH M. COFFEY, OF SCHENECTADY, NEW YORK, ASSIGNOR TO MICA INSULATOR COMPANY, OF NEW YORK, N. Y., A CORPORATION OF NEW JERSEY

COMPOSITE INSULATING MATERIAL

Application filed October 12, 1929. Serial No. 399,363.

My invention relates to a new composite material suitable for use as an electrical insulator and to a process for manufacturing the same. The invention is of particular value where an insulator having both mechanical strength and high surface insulating properties is desired.

Heretofore mica plate, that is sheets composed of layers of mica flakes cemented together with a suitable binder and then pressed, have been employed as insulators when high surface insulation was desired. Where mechanical strength was necessary due to the use of the insulator under strain, it was necessary to use plate of considerable thickness which substantially added to the cost of production; mica plate being a relatively expensive material. Furthermore, such insulators composed of thick mica plate had the disadvantages of not readily conforming to the irregularities of the surfaces between which the insulator was to be used. I have found that an insulator composed partly of asbestos and partly of mica or mica plate if suitably prepared possesses all of the advantages of mica plate used alone, while being more suitable for some purposes than the mica plate and being also more economical to produce. A suitable insulator may be composed of two mica plates, each composed of several layers of mica flakes and a sheet or sheets of asbestos between the plates, or of but one plate of mica with asbestos cemented to one surface thereof. When high surface insulation is desired at both surfaces of the insulator, then the construction using two mica plates with asbestos between is preferred, whereas if it is important for only one of the surfaces to have high surface insulation, mica on one side only of the asbestos is sufficient. A single layer of mica flakes cemented to one or both surfaces of the asbestos may give sufficiently good surface insulation for some purposes.

In constructing the composite mica and asbestos insulator, preferably what is known as "electrical asbestos", that is high grade asbestos substantially free from conducting material is impregnated with a suitable binder such as shellac or glyptal. The impregnated asbestos is then combined with uncured mica plate of the desired number of layers, and the asbestos and mica plate are then cured and pressed together. The composite plate is then cut and moulded, preferably in a cold die; the binding material being first softened by heat. If desired the asbestos and mica may be cured separately, in which case the asbestos should be pressed during the curing. A satisfactory composite insulator may be made by using uncured asbestos having a thickness three times that of the uncured mica plate and the whole pressed to give the completed product the thickness of the original uncured asbestos.

The composite insulating material is of particular value for commutator clamping rings where mechanical strength is needed and where engagement with the commutator requires high surface insulation of the ring. The asbestos gives to the material a certain resiliency which causes the ring to conform more readily to irregularities in shape of the commutator copper bars and thus permits a tighter commutator than would a ring constructed of mica plate alone.

For a better understanding of the invention reference may be had to the accompanying drawings of which:

Figure 1:
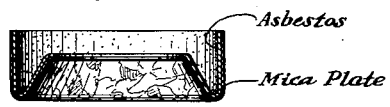
Figure 1 is a diagrammatic sectional view of a commutator clamping ring made from composite material built of asbestos and one mica plate.
Figure 2:
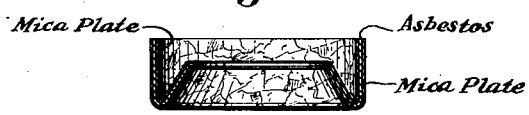
Fig. 2 is a diagrammatic sectional view of a commutator ring built from asbestos and two plates of mica.
Figure 3:
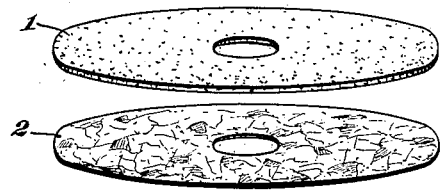
Fig. 3 illustrates a step in the process of forming the commutator ring of Fig. 1.
Figure 4:
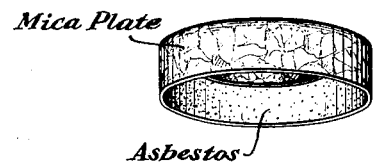
Fig. 4 is a perspective view of the ring of Fig. 1.

In forming a ring such as illustrated in Figs. 1 and 4 a disk 1 (see Fig. 3) of electrical asbestos, impregnated with shellac, and a disk 2 of uncured mica plate composed of mica flakes cemented together preferably with glyptal and of a thickness less than that of the asbestos are placed one upon the other and then pressed and cured together between steam platens. The material while still hot from the presses, may be placed in a cold die where it is cut and moulded into the form illustrated in Fig. 1, viz: with the mica on the outer surface. If allowed to cool after pressing, the material is reheated to soften the cement before insertion into the die. A similar method may be followed for forming the ring illustrated in Fig. 2 using, of course, two mica plates instead of but one.

The outer surface of the commutator ring is that which is in contact with the copper bars when the ring is in position. It is important therefore that there be high surface insulation along this outer surface of the ring, while such good insulation is not so essential for the inner surface. The ring illustrated in Fig. 1 where mica forms the outer surface only of the ring, is thus preferred over that of Fig. 2 where both surfaces are of mica; it being cheaper to produce.

Preferably when commercially manufacturing a quantity of rings, the composite material is made in sheet form from large sheets of asbestos and mica plate rather than from preliminarily cut disks thereof as illustrated for the production of a single ring.

Instead of using shellac for the impregnation of the asbestos and glyptal in preparing the mica plate, either shellac or glyptal could be used for both purposes. Glyptal is superior to shellac when used in electrical insulators, but is more costly. The use of glyptal with the mica and shellac with the asbestos as suggested above combines the advantages of glyptal where needed, namely in contact with the copper bars, with the cheapness of shellac where the electrical properties of glyptal are not necessary. Both shellac and glyptal are binders which are characterized by the fact that they are curable to a controllable degree, may be afterwards softened at temperatures around 300° F. sufficiently to permit of molding of the material impregnated therewith and may again be softened when the material is in use sufficiently to permit the material to conform to irregularities of the engaging surfaces. Any binders having similar characteristics to shellac and glyptal are suitable for use in preparing the composite asbestos and mica insulating material. In place of the asbestos it is possible that other resilient heat resistant materials might be substituted therefor. Asbestos is preferred, however, both on account of its high heat resistant properties and because it has no tendency to carbonize in the event of an electrical discharge on its surface.

A composite insulator as compared with one composed only of mica plate is stronger for the same thickness, conforms more readily to surface irregularities, has as high surface insulation on its mica surface, causes less wear on the dies during manufacture, has a more uniform thickness, and is considerably cheaper to produce.

I claim:

1. A commutator ring having its outer surface of mica plate prepared by cementing mica flakes together with glyptal, said ring having its inner surface of asbestos impregnated with shellac.

2. The method of preparing a composite insulating material of asbestos and mica which consistes in first impregnating asbestos with a suitable cement, then combining it with uncured mica plate and finally pressing, curing and molding the same.

3. The method of manufacturing an article for use as an insulator which consists in curing and pressing together asbestos impregnated with shellac and mica flakes cemented into plates by glyptal, and then forming the article in cold dies.

4. The method of manufacturing an article for use as an insulator which consists in curing and pressing together uncured mica plate and a resilient, heat-resistant material impregnated with a cement having the characteristics common to shellac and glyptal and then forming the article in cold dies.

In testimony whereof, I have signed my name to this specification.

JOSEPH M. COFFEY.